United States Patent [19]
Knapp

[11] Patent Number: 6,057,791
[45] Date of Patent: May 2, 2000

[54] APPARATUS AND METHOD FOR CLOCKING DIGITAL AND ANALOG CIRCUITS ON A COMMON SUBSTRATE TO ENHANCE DIGITAL OPERATION AND REDUCE ANALOG SAMPLING ERROR

[75] Inventor: David J. Knapp, Austin, Tex.

[73] Assignee: Oasis Design, Inc., Austin, Tex.

[21] Appl. No.: 09/025,157

[22] Filed: Feb. 18, 1998

[51] Int. Cl.$^7$ .................................................... H03M 1/00
[52] U.S. Cl. ........................................... 341/122; 341/155
[58] Field of Search ..................................... 341/122, 123, 341/155

[56] References Cited

U.S. PATENT DOCUMENTS 5,055,800 10/1991 Black et al. .
5,422,807 6/1995 Mitra et al. .

FOREIGN PATENT DOCUMENTS 0 413 287   2/1991   European Pat. Off. .
0 487 743   6/1992   European Pat. Off. .
42 14 611  11/1993   Germany .

*Primary Examiner*—Howard L. Williams
*Attorney, Agent, or Firm*—Kevin L. Daffer; Conley, Rose & Tayon

[57] ABSTRACT

An apparatus and method for clocking digital and analog circuits on a common substrate is provided. The apparatus and method serves to reduce digitally derived noise at select times during which the analog input signal is sampled. Analog sampling error is thereby reduced while, at the same time, the digital clocking signal maintains maximum frequency. Digitally derived noise is substantially eliminated near the latter portion of each sampling interval to ensure an accurate sampled value exists at the culmination of that interval. During the earlier portion of each sampling interval, digital clocking pulses are maintained at a high frequency so as to enhance processing speeds. It is determined that only the latter portion of each sample interval is critical to the reduction of sampling error. Furthermore, the digital clocking pulses occur a non-power-of-two factor to ensure tonal noise is not coupled into the analog circuit frequency band of interest.

10 Claims, 6 Drawing Sheets

APPARATUS AND METHOD FOR CLOCKING DIGITAL AND ANALOG CIRCUITS ON A COMMON SUBSTRATE TO ENHANCE DIGITAL OPERATION AND REDUCE ANALOG SAMPLING ERROR

BACKGROUND OF THE INVENTION

1. Field of the Invention

This invention relates to a monolithic semiconductor substrate embodying both digital and analog circuits and, more particularly, to an apparatus and method for reducing noise transferred from digital circuits to analog circuits without limiting digital circuit performance.

2. Description of the Relevant Art

Integrated circuits which embody both analog and digital circuitry on the same monolithic substrate are well known. Examples of such integrated circuits include audio acquisition and/or transmission products. Audio acquisition includes any device which receives and records an audio waveform, and which samples and quantizes that waveform according to discrete time intervals. Audio transmission may include digital audio reproduction—i.e., demodulation and digital processing circuits necessary to manipulate digital information.

Audio acquisition can be accomplished using various types of modulation schemes, such as pulse code modulation, delta-sigma modulation, etc. Regardless of the modulation scheme used, proper audio recording requires the incoming analog signal be sampled at a frequency of at least twice the incoming audio frequency to achieve error-free sampling. Sampling less than the aforesaid minimum causes aliasing problems. During each sample interim, quantization is used to preserve corresponding amplitude information. While sampling records time slices, quantization records amplitude information within each time slice. The combination of sampling and quantization for a given modulation technique thereby completely preserves the audio signal in digital form. Accordingly, audio acquisition must employ analog circuitry useful in sampling (e.g., sample-and-hold circuits) and quantization (e.g., clocked comparator circuits).

Once an analog audio signal is sampled and converted to digital format, the resulting digital signal can thereafter be forwarded back as an analog signal using various audio reproduction techniques. Generally speaking, audio reproduction includes, for example, demodulation circuits, reproduction processing circuits, demultiplexers, digital-to-analog converters, output sample-and-hold circuits, etc. Accordingly, digital audio reproduction is necessary to present back, possibly in digitally processed form, the analog signal previously recorded through analog acquisition.

Generally configured between circuits which perform digital audio acquisition and circuits which perform digital audio reproduction is a digital signal processor (DSP). A DSP is used to manipulate digitally acquired binary numbers. The ease by which digital numbers can be manipulated by a DSP adds importance to reasons why it may be desirable to convert an analog audio signal to a digital audio signal, and why the manipulated data can thereafter be converted back to analog form. Once the analog audio signal is converted to digital, the DSP can easily perform rapid manipulation of that data. DSP operations are prevalent in the telecommunication industry, and are usually found in modems, vocoders and transmultiplexers, etc.

Examples of circuits used to convert an analog audio signal to a digital signal is an analog/digital ("A/D") converter. A digital-to-analog circuit is often referred to as a ("D/A") converter. Placing the DSP between the A/D and D/A converter allows manipulation of the digital information preferably in real time. There may be instances in which multiple A/D and D/A converters are present with multiple DSPs and possibly multiple microprocessors on a monolithic substrate. A clock manager may be used to clock the multiple digital and analog subsystems embodied upon the substrate.

An unfortunate aspect of digital circuitry is the noise created whenever a digital signal transitions between logic 0 and logic 1 values. If digital and analog circuits are to be used on the same monolithic substrate, steps must be taken to minimize transferal of digitally created noise to analog circuits during those transitory times. Steps must also be taken to maximize DSP performance. To maximize DSP performance, the digital circuits must be clocked at their highest allowable rate. The faster a DSP operates, the faster it can process operations. Most DSPs perform three basic operations: multiplication, addition, and delay. Those operations must be performed as quickly as possible since, in most instances, DSPs operations occur in real time. For example, digital processing of a sampled analog signal must be completed within that sampling period. Any technique therefore chosen to reduce transferal of noise must not deleteriously affect the speed at which the DSP or related digital circuitry operate.

The problems of digitally created noise imputed to the analog circuits is best explained in reference to the analog circuits and how they may be employed. FIG. 1 illustrates an example of an input stage of a typical modulator used, e.g., in a delta sigma A/D converter. Switches Q1 and Q2 are activated and deactivated in rapid succession to sample differential analog input signals +VIN and −VIN. The analog signals may be periodically sampled according to the timing diagram shown in FIG. 2. Switches Q1 are closed during times when "signal 1" (shown in FIG. 2) transitions to a logic high value. Likewise switches Q2 are closed during times when signal 2 of FIG. 2 transitions to a logic high value. More specifically, when signals 1 and 2 are high, respective switches Q1 and Q2 are closed, and once a switch is closed, the capacitors C1 and C2 shown in FIG. 1 charge or discharge to the appropriate value. Integrator, INT, performs analog noise-shaping, the output of which is forwarded to a quantizer (not shown).

A delta sigma A/D converter generally comprises a modulator and a digital decimation filter. The modulator samples the analog input at a high frequency and low resolution. The resulting quantization noise from the sampling event is shaped by the modulator so that its noise density is lowest over the frequency band of interest. For audio applications, typically the low frequencies are of interest so that quantization noise is shaped to be the lowest at low frequencies and greatest at high frequencies.

In a typical audio A/D, the digital decimation filter takes the noise shaped modulator output, low pass filters that output, and decimates it to the audio sample rate. The resolution of the decimation filter output is much greater than the modulator output, since the bandwidth is reduced and because the high frequency modulator noise has been low pass filtered.

The A/D converter therefore requests sampling of the analog input. Similar to an A/D converter, sampling is required in a D/A converter which employs an interpolation filter. An interpolation filter generally increases the sample rate, and the delta sigma (or sigma delta) modulator creates a one bit output stream which shapes the quantization noise output. The D/A switched capacitor converts the one bit output to a positive or negative reference (VREF) value, and low pass filters smoothes the discrete voltage steps from the switched capacitor circuit. Interpolation is generally performed in the DSP portion of the substrate, whereas the D/A switched capacitor and continuous time filters are in analog portions of the substrate.

The audio sampling rate (fs) is typically 44.1 kHz or 48 kHz. The analog modulator sampling rate (Fovr) is many times the audio sample rate. Typically, Fovr is 128 fs or 256 fs. For every one audio sample, the modulator samples 128 or 256 times. A plot of a typical delta sigma modulator operating at 128 fs is shown in FIG. 3.

A characteristic of sigma delta modulators which is typically not desirable, is tones which appear in the modulator output near Fovr/2. These tones are very far from the frequency band of interest, however, digital noise coupling into the modulator (i.e., A/D or D/A switched capacitor filter) at frequencies near Fovr/2 can mix with these tones to produce tones in the frequency band of interest.

An understanding of where these tones come from is best explained in reference to the output of a modulator employing a one bit quantizer. This one bit output represents a signal which switches between a positive reference voltage (i.e., "1") and a negative reference voltage (i.e., "0"). If the input to the modulator is at a DC level, then the average of these one bit samples is equal to the DC level applied to the input. For instance, if the input voltage is zero, the output bit stream will consist of an equal number of 1s and 0s. This could be a square wave with a frequency of Fovr/2. In this case, all the quantization noise is localized to a tone at Fovr/2.

In reality, the output of a modulator will not be an exact square wave for a DC level of zero on the input, however, it will have a significant amount of noise energy in a tone at or near Fovr/2. For time varying input signals, the frequency of this tone will vary slightly and multiple tones may appear at and around Fovr/2. Care must be taken to prevent these tones from mixing with any digital noise at Fovr/2 and shifting down to the baseband.

Digital noise on a mixed signal IC can couple into the analog circuitry in a variety of ways. A common means is through the substrate. Transistors or interconnect on an integrated circuit have some form of capacitive coupling to and from the monolithic substrate. Large amounts of digital circuits switching at high frequencies can capacitively couple a significant amount of energy into the substrate causing currents to flow and the voltage to vary. Since the substrate is common between the analog and the digital portions, this energy will couple into the analog circuitry and the analog signal path.

Noise from the substrate can couple into the analog signal path in a linear or non-linear fashion. If it couples linearly (i.e. the amount of coupling is independent of the analog signal level) then the coupling signal is seen directly in the analog signal. If it couples non-linearly (i.e., the amount of coupling is dependent on the analog signal level) the coupling signal will then mix with the analog signal. The sum and difference frequencies of the original analog signal and the coupling signal are seen on the resulting analog signal.

Linear coupling could occur between the substrate and the bottom plate of a poly—poly capacitor, while non-linear coupling could occur between the substrate and the source/drain of a transistor. The capacitance between the substrate and the bottom plate of a poly-poly capacitor does not vary significantly with the voltage difference. The capacitance between the substrate and the source or drain of a transistor, however, does vary with the voltage difference. This nonlinearity causes the signal to modulate the other signal, the result of which is a sum and difference frequency in the output signal. The following equation illustrates this concept:

$$\sin(w1*t)*\sin(w2*t)=\sin[(w1+w2)t]+\sin[(w1-w2)t],$$

where w1 and w2 are the frequencies of the two analog signals.

As described earlier, delta sigma modulators produces tones near Fovr/2. If there is signal energy in the substrate from the digital circuit position with a frequency of Fovr/2, this will mix with the tones and produce difference frequencies in the baseband (0 to fs/2). In order to prevent this from happening, it is important to ensure that very little digital circuitry operates at Fovr/2.

It is common for digital circuitry in a mixed signal chip to operate at powers of two times the sample rate (fs). This is partially due to the ease of implementing dividers that divide a frequency by two. A divide by two can occur simply using a flip-flop.

Digital interfaces on commonly used A/D and D/A converters and DSPs operate with clock rates that are powers of two times the sample rate. The interpolation and decimation filters of sigma delta A/D and D/A converters typically operate at various power of two rates, such as 64 fs, 128 fs, etc. Circuitry operating at a particular rate couples noise into the substrate at that rate.

Software running in DSPs can produce digital noise in the substrate. Different instructions use different physical circuitry. For instance, a multiply instruction uses the multiply unit, while a move instruction does not. An operation that operates on the contents of register and stores the result back in a register does not use data memory, while memory-to-memory operations do. Typically, memory-to-memory operations and multiply instructions consume the most power, while move instructions and register-to-register operations consume less. The more power consumed, typically, the more noise is coupled into the substrate. Software programs on DSPs typically repeat at powers of two times the sample rate. This repeating produces digital noise in the substrate at that rate.

Converters or modulators which operate at powers of two times the sampling rate (i.e., $2^N$fs) receive noise, via the monolithic substrate, from processors or DSPs operating at $2^N$fs, where N is an integer value of 1, 2, 3, 4, etc. Noise imputed across the substrate from the digital circuits to the analog modulator typically affect the switched capacitors of the modulator. It is commonly known that when switched capacitor circuits are integrated on the same IC with a significant amount of digital circuitry, the switches need to be turned off at a time when the digital circuitry is quiet. Traditionally, this has been done by clocking the digital and analog circuitry at the same frequency, but with the digital clock delayed relative to the analog clock. The digital switching occurs shortly after the switches are closed and the digital noise from the switching settles prior to the next sample event as shown in FIG. 4.

Switch capacitor circuits require two non-overlapping clocks derived from the analog clock of FIG. 4 to control the switches. Exemplary switches within a switched capacitor network of a conventional modulator are shown in FIG. 1, and non-overlapping clocks are shown in FIG. 2.

In other implementations, the digital clock frequency is higher than the analog clock frequency, however, the digital clock is still delayed relative to the analog clock. This implementation allows the digital circuitry to be clocked faster, which can be advantageous, at the cost of reduced quiet time. FIG. 5 illustrates a digital clock transitioning at twice the speed of the analog clock.

It is advantageous to increase the speed of the digital clock relative to the analog clock since the digital circuitry can typically operate at a much higher frequency than the analog circuitry. In the case of a DSP integrated with switch capacitor circuits operating on audio signals, the DSP can run at clock frequencies of 100 MHz and above. The switch capacitor circuits are typically clocked at a few MHz. To achieve maximum performance from the DSP, it is best to operate it with the fastest clock possible. By simply increasing the digital clock frequency as shown in the previous example, the quiet time immediately preceding each analog transition (i.e., sample) decreases to the point of significantly degrading performance of the analog modulator by providing more noise to switched capacitors.

The most sensitive time in which to avoid digital noise within the modulator is just before and during the time when the switches are closing. (i.e., the falling edges of the clocks which operate those switches). The implies that the DSP, microprocessor core logic, and various other digital circuits on the substrate can run at full speed during much of the time when the switches are closed. However, care must be taken to modify the digital clock so the digital circuit clocks are temporarily terminated at appropriate, crucial sampling times.

SUMMARY OF THE INVENTION

The problems outlined above are in large part solved by an improved clocking scheme. The clocking scheme hereof minimizes the effects of digitally created noise upon analog circuits, wherein the digital and analog circuits share a common monolithic semiconductor substrate. The monolithic substrate is a semiconductor chip, comprised essentially of silicon or gallium arsenide. Clocking of the digital circuits are controlled relative to the times in which analog circuits perform sampling on an incoming audio (analog) input signal. By deleting or suppressing digital pulses during a latter portion of each sample interval, noise transferal during digital clock transitions do not interfere with the integrity of the sampled analog input signal. Since there are no transitions during the latter portion of each sample interval, there can be no digitally created noise arising at this critical sampling time.

The converters are advantageously operated with an oversampling rate (Fovr) that is not a power of two of the sample rate (fs). For instance, if the oversampling rate is 96 fs, Fovr/2 is 48 fs, which is not a power of two. More specifically, 96 or 48 is not a number which can be derived by $2^N$, where N is a positive, integer number. Since it is uncommon to operate the digital circuitry at a non-power of two rate, there should be little noise power in the substrate at Fovr/2. This means the tones that exist near Fovr/2 in the delta sigma modulated signals will not be mixed into the baseband. The difference frequency between a non-power-of-two frequency (i.e., 48 fs) and a power-of-two frequency (i.e., 32 fs and 64 fs), which are the closest power of two rates, is 16 fs. The 16 fs energy will be generated in the analog signals, however, it is far from the baseband and will be filtered by the decimation filter in the A/D converter or the switched capacitor and continuous time filters in a D/A.

In addition to clocking the digital circuits at non powers-of-two rate, the digital circuit is advantageously clocked at full speed, whereby one or more pulses from the clock prior to the sensitive analog sample times is/are removed. This enables the DSP to operate at full speed most of the time and for the substrate to be quiet the minimum amount needed by the analog circuitry.

By not suppressing digital pulses during the early portions of each sample interval (i.e., each logic 1 or logic 0 pulse), a substantial percentage of the original digital clocking frequency is maintained. It is determined that a critical sampling time occurs primarily during the latter portions of each sample interval. The early portions do not significantly affect the final sampled value provided, however, the semiconductor substrate is quiet during the latter portions. Eliminating digital pulses only during the latter portions thereby minimizes the reduction in digital clocking frequency.

BRIEF DESCRIPTION OF THE DRAWINGS

Other objects and advantages of the invention will become apparent upon reading the following detailed description and upon reference to the accompanying drawings in which.

Figure 1:
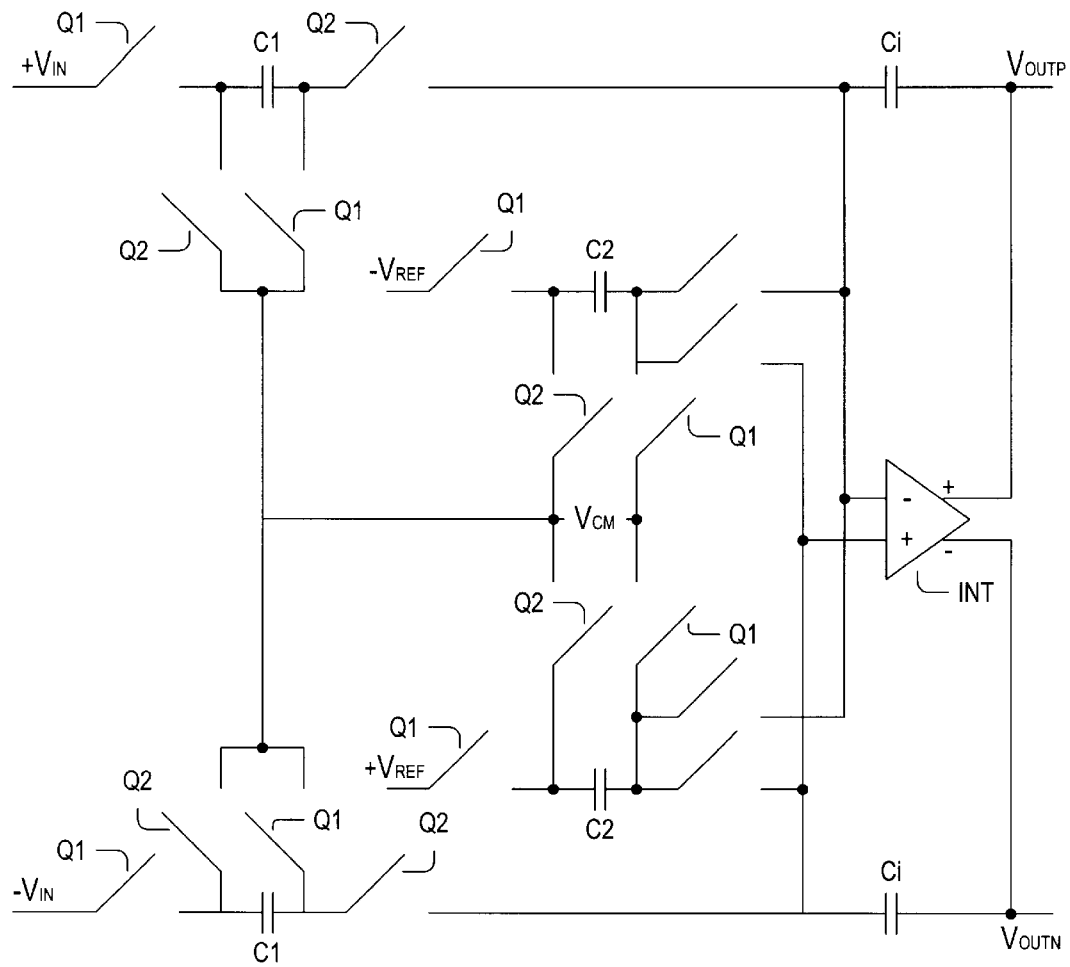
FIG. 1 is circuit diagram of an input stage of a conventional modulator employed as a switched capacitor circuit.
Figure 2:
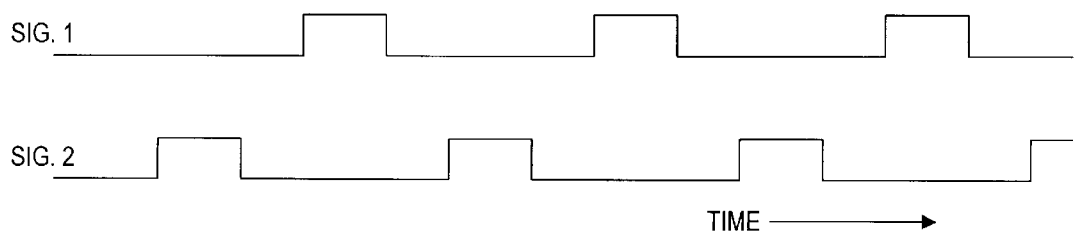
FIG. 2 is a timing diagram of signals used to transition switches within the modulator of FIG. 1.
Figure 3:
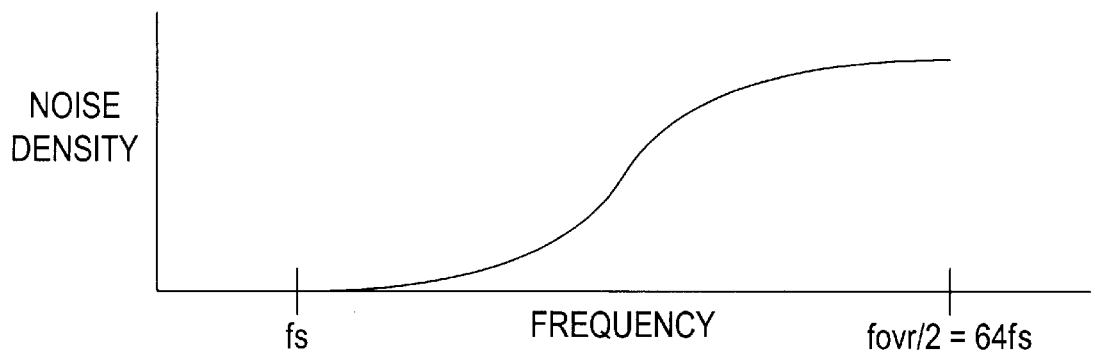
FIG. 3 is a graph of noise density as a function of sample frequency.
Figure 4:
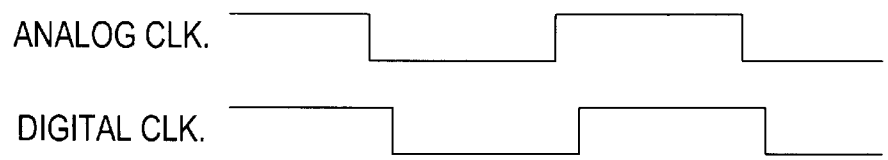
FIG. 4 is a timing diagram of analog and digital clocking signals used to clock respective circuits upon a monolithic substrate.
Figure 5:
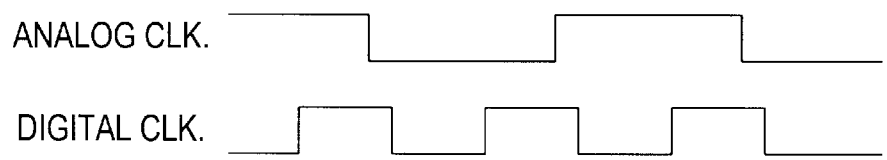
FIG. 5 is a timing diagram of a high speed digital clock used in conjunction with a slower analog clock.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

A PLL and clock dividers can be used to create the various clock rates which are required by a typical mixed signal integrated circuit. The integrated circuit requires one timing source. This timing source can be an on chip oscillator or an external clock input. It can also be derived from a serial bitstream input to the chip. The on-chip or external clock can be divided by M prior to being applied to the phase-locked loop ("PLL") and the feedback divider in the PLL can multiply the input to the PLL by N. The output of the PLL can further be divided, if needed, by another factor P to create the oversampling clock (Fovr). The frequency divisor P can be a part of a clock manager (shown in FIG. 7). If a serial bitstream with clock information encoded into it is applied to the PLL, no division by M is possible unless a second PLL is used.

Figure 6:
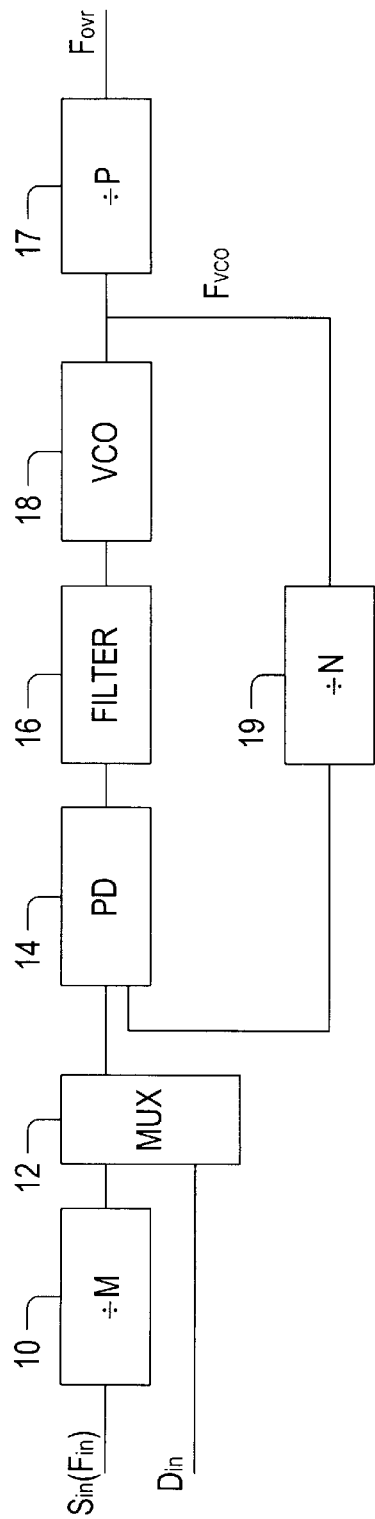
FIG. 6 is a block diagram of a PLL, multiplexer and various clock dividers used to produce a signal having an oversampled clock frequency (Fovr) from an incoming signal (Sin) having a clock frequency (Fin)

The input signal Sin applied to the PLL from either an external or internal source is clocked at a frequency of Fin. Din is the frequency of the clock encoded in a data timing source, Fvco is the frequency of the PLL output, and Fovr is the frequency of the converter oversampling clock. The various signals and associated frequencies are shown in FIG. 6. FIG. 6 also depicts a divider 10, a multiplexer 12, a phase detector ("PD") 14, a loop filter 16, a voltage controlled oscillator ("VCO") 18 and a feedback divider 19, the latter elements of which are in a PLL. Another divider 17 (with division factor P) may output a signal from the PLL clocked at an oversampled frequency Fovr.

The frequencies of all the signals are related as follows:

$$Fvco = (N/M)*Fin \qquad Fvco = N*Din$$

$$Fovr = (N/MP)*Fin \qquad Fovr = (N/P)*Din$$

Fin and Din must be rationally related to the sample rate (fs) as follows:

$$Fin = (Q/R)*fs \qquad Din = (Q/R)*fs$$

This means Fvco and Fovr are related to the sample rate as follows:

$$Fvco = (QN/RM)*fs \qquad Fvco = (QN/R)*fs$$

$$Fovr = (QN/MPR)*fs \qquad Fovr = (QN/PR)*fs$$

Provided QN/MPR has a prime factor that is not one or two, the oversampling clock (Fovr) will not be a power of two and will prevent digital noise at power of two frequencies in the substrate from mixing the Fovr/2 tones in the sigma delta modulated signal into the baseband. For example, one mode of the present implementation accepts a 64 fs input clock (Fin) multiplied by 24 (N) to create a 1536 fs VCO clock (Fvco), and divides the VCO clock by 16 to create 96 fs oversampling clock (Fovr). The means Q=64, R=1, M=1, N=24, and P=16. The ratio QN/MPR is 64*24/1*16*1=96=2*2*2*2*2*3, which is a non power-of-two factor.

Another example that would also work is:

$$Fin = 384fs \qquad M = 3 \qquad N = 16 \qquad P = 24$$

which means Fvco=(384/3)*16=2048 fs, and Fovr=(2048/24)*fs=85.333 fs

In this example QN/MPR=(384*16)/(3*24*1)=256/3, where 256 is a power of two; however, the prime factor three resides in the denominator. Thus, Fvco is determined as a non power-of-two factor of fs, or as a power-of-two factor divided by a prime number of at least three.

Although any prime factor greater than two in the numerator or denominator of QN/MPR fits the present criteria, the factor of three is typically the simplest to implement.

Figure 7:
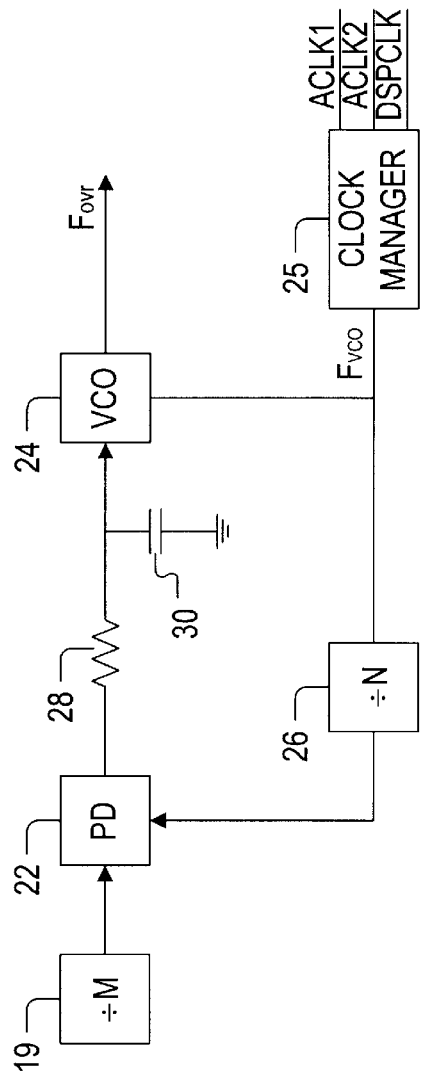
FIG. 7 is a block diagram of a clock manager used in conjunction with frequency multiplier and a PLL for producing digital (Fvco) and analog (Fovr) clocking signals according to one exemplary embodiment.

Turning now to FIG. 7, a block diagram of a frequency multiplier 20 is shown according to one embodiment. Frequency multiplier 20 is used to frequency multiply a clocking signal derived either external or internal to the integrated circuit. The frequency multiplied sampling frequency is a multiple of the incoming frequency Fin, and is shown as Fvco. A frequency multiplier can be employed using various types of amplifiers and/or phase-locked loops. For example, frequency multiplication can be carried out using a non-linear amplifier which generates harmonics in its output current and a tuned load that resonates at one of the harmonics. Alternatively, frequency multiplication can be carried out using non-linear capacitance of a junction (semiconductor) diode to couple energy from the input circuit, which is tuned to the fundamental frequency of the output circuit, which is tuned to the desired harmonic. Use of amplifiers and non-linear capacitance coupling represent two frequency multiplication examples, a third being a phase-locked loop with a frequency divider in the feedback loop. These examples, including numerous others, fall within the spirit and scope of frequency multiplication in general. Any frequency multiplier or frequency multiplication factor set forth herein below can be carried out using any one of the various types of frequency multipliers so described.

According to one exemplary embodiment, frequency multiplier 20 includes a phase-locked loop (PLL). PLL comprises any electronic circuit which locks an oscillator in phase with an input signal. The PLL tracks a carrier or synchronizing signal whose sampling frequency fs varies somewhat with time. The basic frequency multiplier circuit 20, employed as a PLL, includes a frequency divider 19, a phase detector (PD) circuit 22, a voltage controlled oscillator (VCO) circuit 24, and another frequency divider circuit 26. Phase detector 22 detects and tracks small differences in phase and frequency between the incoming baseband signal Sin and the frequency divided signal at the output of frequency divider circuit 26. Output pulses from detector 22 are proportional to the phase differences of those incoming signals. A low-pass filter comprising, e.g., resistor 28 and capacitor 30, removes alternating current (AC) components. The low-pass filter output is directed, as a direct current (DC) signal, into oscillator 24. Input voltage to oscillator 24 acts to change the output frequency of oscillator 24 to that of the carrier signal.

The PLL shown in FIG. 7 is configured as a frequency multiplier by operating oscillator 24 at N/M times the input frequency of the incoming clocking signal transitioning at frequency Fin. Accordingly, the output from oscillator 24 operates at a higher frequency than the incoming clocking signal Sin. In the general loop, the output is driven in a direction that will minimize the error signal—i.e., the phase difference between the output of frequency divider 26 and the sampling signal. Thus, the PLL tends to drive the error signal back toward zero phase difference. Once the two phases are made equal, the oscillator 24 will be locked to a multiple frequency of Fin, and any phase difference between the two signals will be controlled.

Frequency divider circuit 26 includes any electronic circuit which produces an output signal at a frequency which is an integral submultiple of the frequency of its input signal. A frequency division can be conveniently accomplished in two ways: digital division or division by subharmonic triggering. Using the former as an example, many circuits are available to count pulses and thereby provide digital division. A bi-stable circuit or flip-flop produces one output pulse for every two input pulses. By cascading successive flip-flops, any desired degree of division can be obtained. Division by power to two can be achieved simply by monitoring the output of the proper stage of the cascade. However, division by other numbers beyond the power of two is required and can be achieved by gating to obtain the proper set of flip-flop conditions. Frequency divider circuit 26 thereby employs any number of stages and gate logic necessary to produce an N frequency division. For example, a four stage counter is necessary to produce a frequency divider N of 16, i.e., $2^4$ state.

Further included with frequency multiplier 20 is a clock manager 25. Clock manager 25 receives the frequency multiplied DCLK value and produces a corresponding ACLK1, ACLK2 and DSPCLK values. According to one example, Fin after M division can be equal to a Nyquist sampling rate, fs, of 48 KHz, and multiplier factor N can be 1536, making Fvco equal to 1536 fs, or approximately 67 MHz. The DSPCLK has one or more 1536 fs clock pulses removed prior to the falling edges of ACLK1 and ACLK2. This means that the digital noise from the DSP has settled prior to the analog sampling event. The PLL locks to the baseband sample rate fs or some multiple of fs (e.g., 1536 fs), from which the analog (ACLK1 and ACLK2) clocks and DSP (DSPCLK) clocks are generated via clock manager 25.

The N division factor of divider 26, or the combination of factors M and N, produce a factor determined by a power-of-two times a prime number equal to or greater than three. Thus, N can be for example $2^9 \times 3 = 512 \times 3$, or 1536. It is important that the frequency of Fvco (e.g., 1536 fs) be a number which is divisible by a prime number equal to or greater than three. Generically, N is $2^A \times B$, or $2^A \times C$, or $2^A \times D$, etc., where A=an integer number, B=3, C=5, D=7, etc. The progression of B to C to D is that of prime number beginning with three and increasing to 5, 7, etc.

Figure 8:
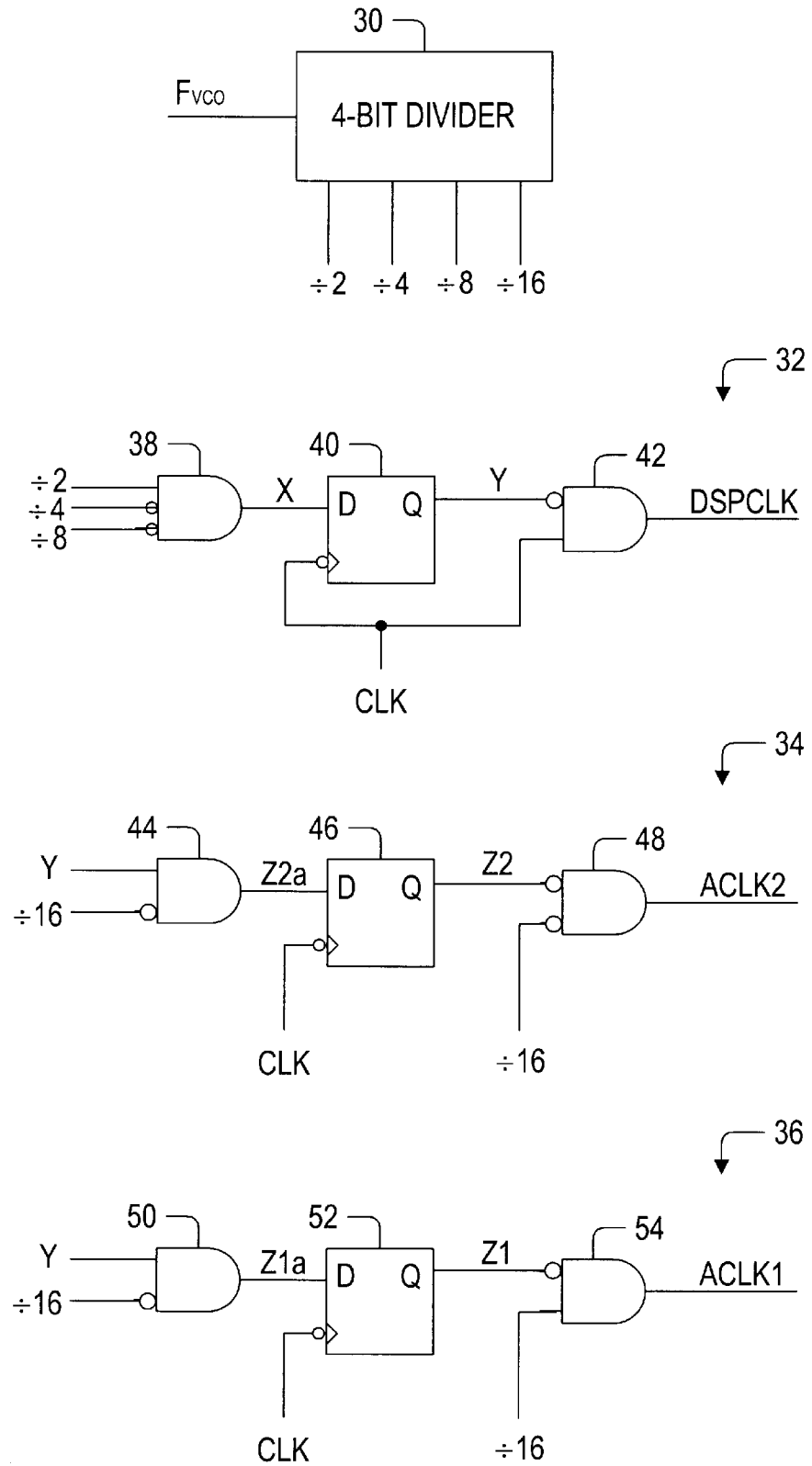
FIG. 8 is a block diagram of a clock suppression circuit and associated logic shown according to an exemplary embodiment for producing digital (DSPCLK) and analog (ACLK1 and ACLK2) clocking signals of variable frequency.

Clock manager 25 comprises a clock divider and some logic to generate the desired clocks. Referring to FIG. 8, various portions of the clock manager are shown. In particular, a 4-bit divider (or counter) 30 is shown which receives the multiplied baseband signal Sin. The frequency of Fvco is divided by factors of 2, 4, 8 and 16 to produce corresponding signals used by logic circuits 32, 34 and 36 to produce respective clocks for the DSP, and the modulator (i.e., switched capacitor circuit) both of which are embodied on a single substrate.

Circuit 32 includes a three input AND gate 38, the output of which is fed into a delay input of a D-type flip flop 40. The non-inverted output of flip flop 40 is then presented as a "Y" signal, which is then inverted and applied to one input of AND gate 42. The output of AND gate 42 is DSPCLK.

Circuit 34 includes a two input AND gate 44, the output of which is fed into a delay input of a D-type flip flop 46. The non-inverted output of flip flop 46 is then presented to AND gate 48. The output of AND gate 48 is ACLK2.

ACLK1 is produced similar to ACLK2, except ACLK1 is produced using AND gate 50, D-type flip flop 52 and AND gate 54 connected as shown in circuit 36. Frequency divider circuit 30 divides by integer to the power of two.

Logic 32, 34 and 36 includes any and all functionality necessary to delete at least one clock cycle of DSPCLK at regular count intervals. Signal X shown in circuit 32 occurs once every eight cycles of CLK, and signal Y is delayed one cycle of CLK. Signal Y thereafter defines respective clock pulses Z1 and Z2 once every eight cycles of CLK. Each clock pulse Z2 occurs between respective pairs of pulses Z1.

Figure 9:
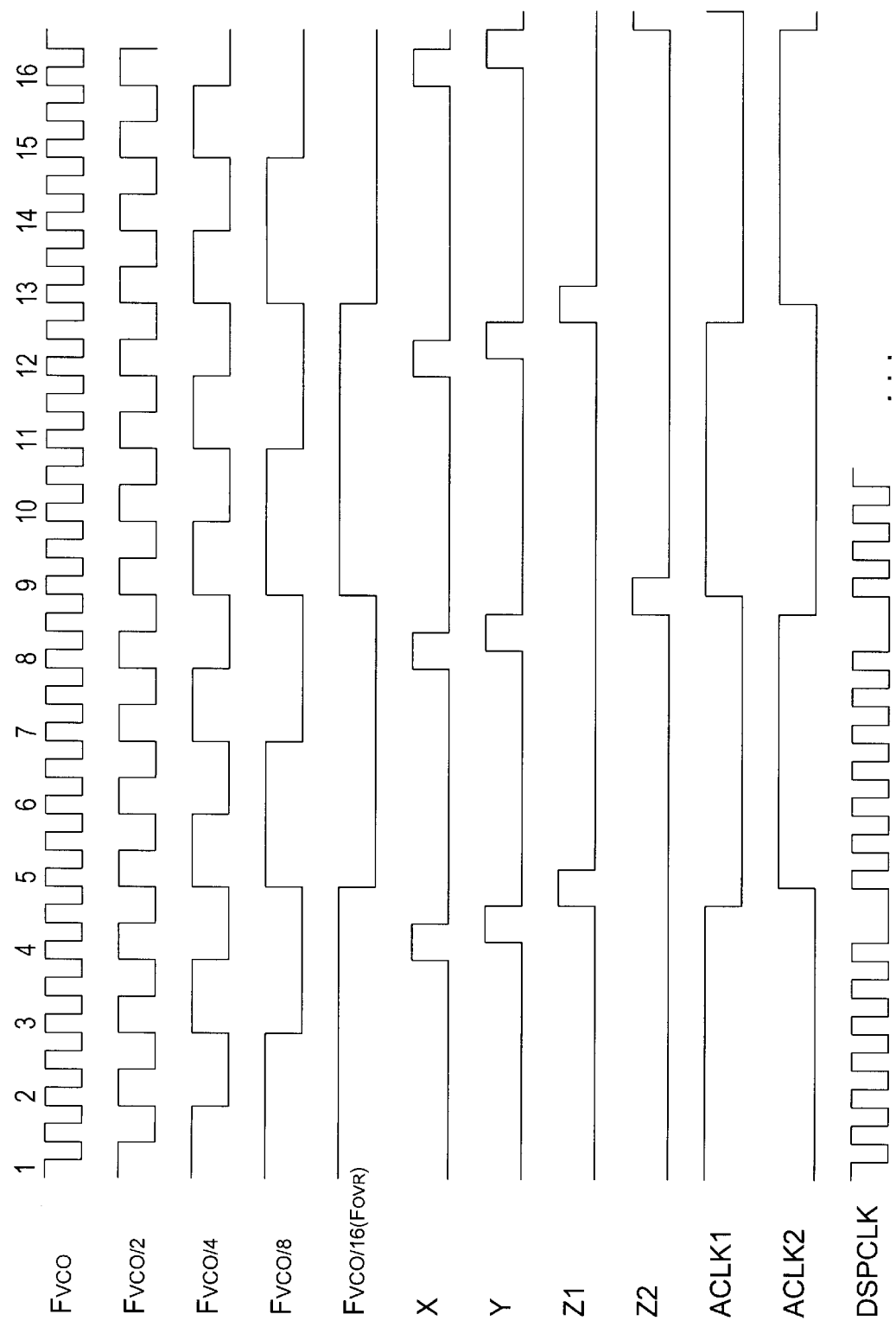
FIG. 9 is a timing diagram of digital and analog clocking signals produced according to an exemplary embodiment from the circuits shown in FIGS. 7 and 8.

The DSPCLK is created by ANDing the Fvco with signal Y. Signal Y is the same as signal X except delayed by one half of the VCO clock period. Signal X is generated by ANDing Fvco/2, the inverted version of Fvco/4, and the inverted version of fvco/8. Signal X goes high at the rising edge of Fvco just prior to the rising edge of the pulse to be removed from Fvco to generate DSPCLK. Since Fvco/2, Fvco/4, and Fvco/8 may transition at slightly different times, X may momentarily glitch just after rising edges of Fvco. Signal Y is created to eliminate these glitches prior to gating with Fvco to generate DSPCLK. A timing diagram of Fvco, Fvco/2, Fvco/4, Fvco/8, Fvco/16, X, Y, Z1, Z2, ACLK1, ACLK2 and DSPCLK are shown in FIG. 9.

The non-overlapping clocks ACLK1 and ACLK2 are created by ANDing Fovr and the inverted version of Fovr respectively with the inverted version of signals Z1 and Z2 respectively. The signals Z1 and Z2 are created in order to remove the last half Fvco clock cycle from the high time of Fovr and the inverted version of Fovr to create ACLK1 and ACLK2 respectively. The signal Z1 is high one half Fvco clock cycle before Fovr goes low and one half Fvco clock cycle after Fovr goes low. The signal Z2 is high one half Fvco clock cycle before Fovr goes high and one half Fvco clock cycle after Fovr goes low. The signal Z2 is high one half Fvco clock cycle before Fovr goes high and one half Fvco clock cycle after Fovr goes high. Z1 and Z2 are created by delaying the signals Z1a and Z2a by one half of an Fvco clock period. Z1a and Z2a are created by ANDing Y with Fovr and the inverted version of Fovr respectively.

Figure 10:
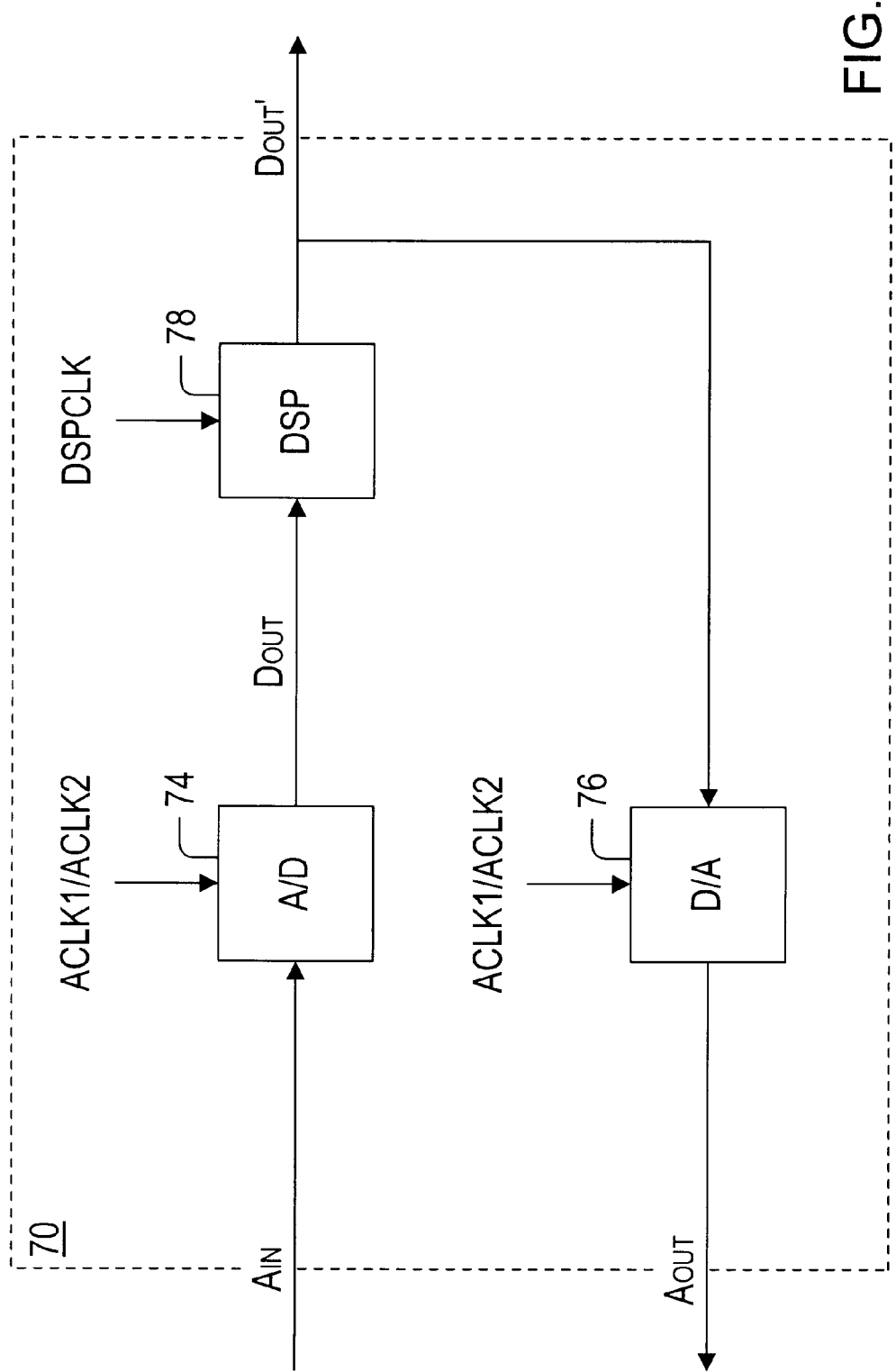
FIG. 10 is a block diagram an integrated circuit embodying analog and digital circuits which are clocked by respective analog digital clock signals hereof.

Turning now to FIG. 10, an integrated circuit 70 is shown which illustrates both analog and digital circuits on the same monolithic substrate. Integrated circuit 70 includes analog circuitry which acquires an analog (audio) input signal AIN. Integrated circuit 70 further includes a digitally operated processor which manipulates digital representations of AIN and reproduces an analog output AOUT from those digital representations. Accordingly, integrated circuit 70 includes a mechanism for sampling and quantizing AIN according to discrete time intervals. The sampled AIN signal is then converted to digital format, whereby resulting digital signals are processed using various DSP algorithms. Thereafter, the processed digital signals can be reproduced back as audio signals AOUT. In the interim, the processed digital signals can, if desired, be output as DOUT'.

Integrated circuit 70 includes any circuit having both analog (sample/quantizer) functions and digital (digital processing and reproduction) functions employed upon a single monolithic substrate. Integrated circuit 70 includes an analog-to-digital (A/D) circuit 74 which receives AIN. A/D circuit 74 samples AIN, and quantizes the magnitude of the sampled signal during each sample interval. A/D circuit 74 may include an analog low pass filter, possibly employed as an integrator, subsequent to the sampling function. The output from A/D circuit 74 is represented as a bit stream of digital signals, shown as DOUT. A/D circuit 74 samples and quantizes according to an analog clocking signal ACLK. If ACLK frequency is large, oversampling attributed to well known delta-sigma modulation may occur. Delta-sigma modulation produces a DOUT signal having a bit stream of logic 1s relative to logic 0s which is indicative of AIN voltage magnitude. A/D circuit 74, however, encompasses a generalized modulator, and not simply an oversampled modulator. A/D circuit 74 includes any circuit which samples and quantizes at a rate defined by an analog clocking signals ACLK1 and ACLK2.

D/A circuit 76 is clocked by ACLK1/ACKL2, whereas DSP 78 may be clocked by a digital clocking signal DSP-CLK. The digital clocking signal can take on several different frequencies depending upon which frequency is selected. The digital clocking signal frequency chosen is, however, of higher frequency than the analog clocking signal ACLK1/ACKL2 for the reasons and having the advantages stated above. The D/A circuit 76 can be an oversampling type converter, in which an analog portion of the D/A circuit basically functions as a reference voltage selector followed by low pass filtering. Either a positive or a negative reference voltage (either +VREF or −VREF) is selected by D/A circuit 76 in accordance with its receipt of a high logic level or a low logic level, respectively.

DSP 78 includes any unit which processes digital signals with multiply, add and/or delay operations. Those basic operations allow DSP 78 to perform complex digital filtering, digital scaling, decimation and/or interpolation. DSP 78 includes input and output devices, an arithmetic logic unit, a control unit, memory, and interconnect buses extending therebetween. Resulting from digital manipulation, DOUT is converted to a processed bit stream denoted as DOUT'. Integrated circuit 70, shown in FIG. 10, thereby includes A/D digital recording devices, D/A digital reproduction devices, and DSP digital processing devices, all upon a single monolithic substrate. The digital clocking signal is not only user programmable to one of many fixed frequencies, but the frequency chosen is maintained at a higher frequency magnitude than the analog clocking signal.

It will be appreciated by those skilled in the art having the benefit of this disclosure that this invention is believed to be capable of applications with any integrated circuit having both analog and digital portions. Furthermore, it is also to be understood that the invention shown and described is to be taken as presently preferred embodiments. Various modifications and changes may be made to the recording, processing and reproduction devices necessary to record a digital representation of an analog signal, process the digital representation, and reproduce an analog signal, all of which would be obvious to a person skilled in the art without departing from the spirit and scope of the invention as set forth in the claims. It is intended that the following claims be interpreted to embrace all such modifications and changes, and accordingly, the specification and drawings are to be regarded in an illustrative rather than a restrictive sense.

What is claimed is:

1. An integrated circuit, comprising:

an analog clocking signal adapted to sample a signal forwarded to an analog circuit, wherein the analog clocking signal transitions at a nyquist sampling rate times a prime number greater than two, and further times $2^N$, where N is an integer value; and a digital circuit embodied upon the same monolithic substrate as the analog circuit, wherein the digital circuit is adapted to receive a digital clocking signal having at least one pulse suppressed at times when the analog clocking signal transitions between a pair of logic states, wherein the pulse is suppressed during a latter portion of each one half clock cycle of the analog clocking signal, wherein said latter portion is less than fifty percent of each one half clock cycle.

2. An integrated circuit, comprising an analog clocking signal adapted to sample a signal forwarded to an analog circuit, wherein the analog clocking signal transitions at $2^N$ (where N is an integer value) times a nyquist sampling rate, the product of which is further divided by a prime number greater than two.

3. The integrated circuit as recited in claim 2, wherein the signal being sampled is a signal whose magnitude varies in time, and wherein the analog circuit comprises a switched capacitor circuit.

4. The integrated circuit as recited in claim 3, wherein the switched capacitor circuit comprises a delta sigma analog-to-digital circuit.

5. The integrated circuit as recited in claim 2, wherein the signal being sampled comprises a substantially constant reference voltage, and wherein the analog circuit comprises a switched capacitor circuit.

6. The integrated circuit as recited in claim 5, wherein the switched capacitor circuit comprises a delta sigma digital-to-analog circuit.

7. The integrated circuit as recited in claim 2, wherein the prime number is equal to three.

8. The integrated circuit as recited in claim 2, further comprising a digital circuit embodied upon the same monolithic substrate as the analog circuit, wherein the digital circuit is adapted to receive a digital clocking signal having at least one pulse suppressed at times when the analog clocking signal transitions between a pair of logic states.

9. The integrated circuit as recited in claim 8, wherein the pulse is suppressed during a latter portion of each one half clock cycle of the analog clocking signal.

10. The integrated circuit as recited in claim 9, wherein said latter portion is less than fifty percent of each one half clock cycle.

* * * * *